A. JENSEN.
LIQUID HEATING OR COOLING APPARATUS.
APPLICATION FILED JAN. 22, 1920.
1,380,967.
Patented June 7, 1921.
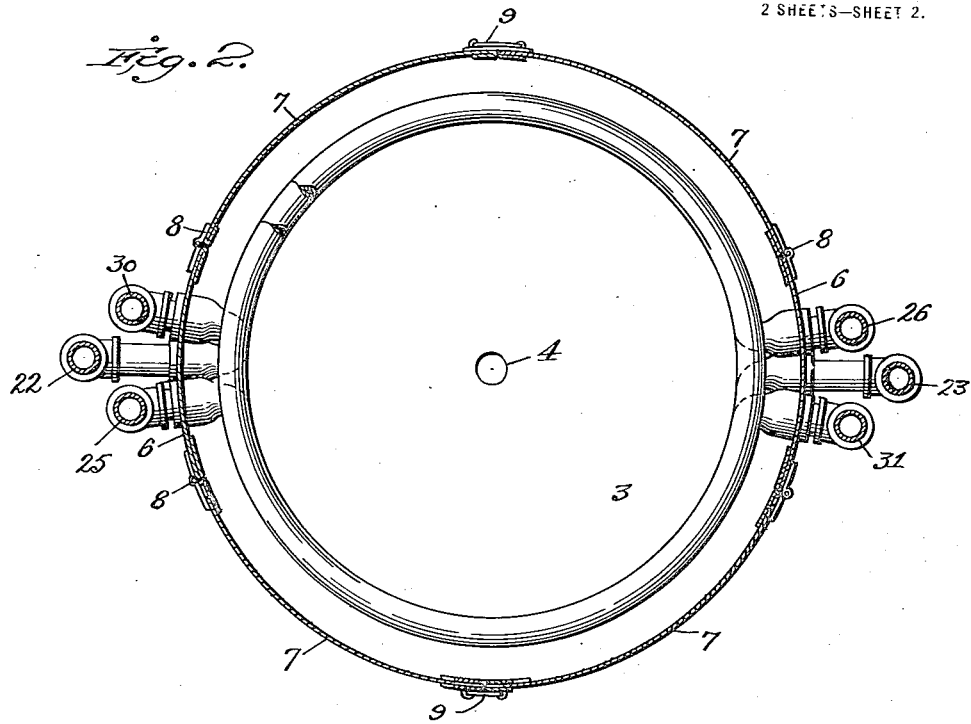
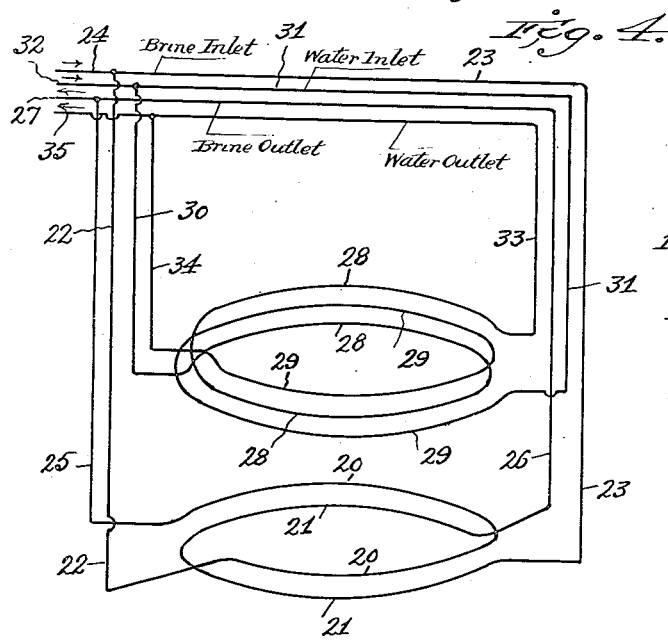
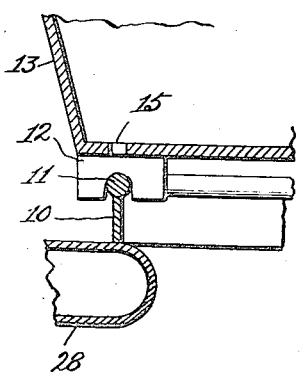

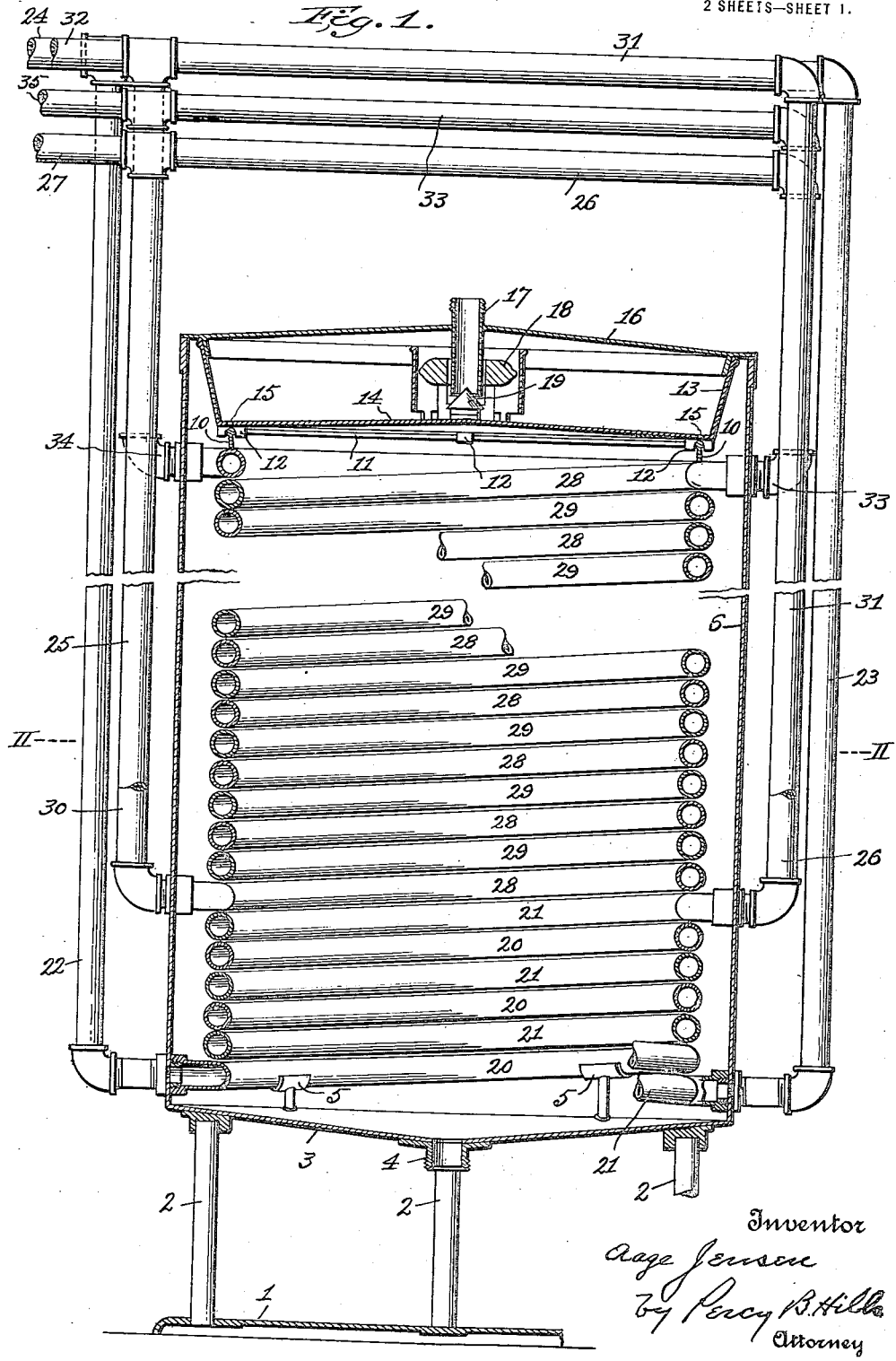

UNITED STATES PATENT OFFICE.

AAGE JENSEN, OF PORTLAND, OREGON, ASSIGNOR TO JENSEN CREAMERY MACHINERY COMPANY, INC., A CORPORATION OF NEW YORK.

LIQUID HEATING OR COOLING APPARATUS.

1,380,967.

Specification of Letters Patent. Patented June 7, 1921.

Application filed January 22, 1920. Serial No. 353,281.

*To all whom it may concern:*

Be it known that I, AAGE JENSEN, a citizen of the United States, residing at Portland, county of Multnomah, State of Oregon, have invented certain new and useful Improvements in Liquid Heating or Cooling Apparatus, of which the following is a specification.

My invention relates to apparatus for heating or cooling milk, cream and the like, and has for its primary object to provide a structure wherein the liquid to be treated will be subjected, in a descending flow, to the action of the heating or cooling medium in such manner as most effectually to accomplish the desired result.

More specifically my invention contemplates the flow of the liquid to be treated downwardly over a series of helical coils through which a heating or cooling medium is passed, said coils being so arranged that the temperature of the heating or cooling medium may be varied in different portions of the coils.

Another object of the invention is so to arrange the coils that the heating or cooling medium may be introduced thereinto at different points and caused to flow through alternate coils, whereby more effective heating or cooling results are accomplished.

These objects I obtain in the manner and by the means hereinafter described and claimed, reference being had to the accompanying drawings, in which:—

Figure 1 is a vertical sectional view of an apparatus embodying my improved construction.

Fig. 2 is a transverse sectional view, taken on the line II—II of Fig. 1.

Fig. 3 is an enlarged detail sectional view of one side of the supply pan and its support.

Fig. 4 is a diagrammatic view, illustrating the arrangement of the coils and their supply and discharge pipes.

Similar numerals of reference denote corresponding parts in the several views.

In the said drawings the reference numeral 1 denotes a suitable base, to which are fixed upright supports 2, which in turn carry the bottom pan 3 having a central discharge 4 leading to a suitable container. Mounted at intervals upon said pan 3 are cradles or supports 5, which receive the lowermost of the coils hereinafter described. The bottom pan 3 is extended into a circular vertically disposed casing 6 completely inclosing the coils, said casing being provided with suitable doors 7, hinged at 8, and provided with suitable catches 9, whereby access may be had to the coils. Mounted upon the topmost coil is an annular ring 10 beaded around its upper edge at 11, and receiving lugs 12 fixed to the lower side of a supply pan 13, whereby said pan will be supported upon said coils. The bottom of said pan 13 is formed slightly cone-shaped at 14, and near its outer edge is provided with a series of discharge apertures 15, whereby the liquid to be treated readily will drain from said pan onto said ring 10. Said pan 13 is closed by a removable cover 16, through which passes centrally a supply pipe 17, the edges of said cover being extended to overlap the upper edge of the casing 6, as seen in Fig. 1. Mounted in the pan 13 is a suitable float 18, controlling a valve 19, whereby the flow of liquid into said pan will be regulated automatically.

Referring now to the coils within the casing 6, the arrangement of the same is shown diagrammatically in Fig. 4, wherein the supply and discharge pipes therefor are marked to indicate their manner of use in connection with a cooling media. Thus, the lower section of the coils is divided into two separate coil-sets 20 and 21, arranged alternately, said sets being supplied from opposite sides of the casing by pipes 22 and 23 leading from a common supply pipe 24, said pipes 20 and 21 discharging also on opposite sides of the casing 6 through pipes 25 and 26, respectively, said latter pipes communicating with a common discharge pipe 27. Disposed above these coils 20 and 21 are two sets of similar coils 28 and 29, similarly supplied from opposite sides through pipes 30 and 31, respectively, leading from a common supply pipe 32, the discharge from said coils being through the pipes 33 and 34, leading to a common discharge pipe 35. By this arrangement I am enabled to subject the liquid to be treated, in its passage downward over the said coils, to the action of cooling medium of different temperatures. Thus, the upper coils 28 and 29 may be supplied with cold water to impart an initial cooling to the liquid being treated, while the lower coils 20 and 21 may be supplied with brine at a much lower temperature, whereby the partly cooled liquid will be subjected to a still greater degree of cold to complete the treatment. It will also be observed that by employing two sets of coils in the upper and lower sections, supplied from opposite sides, said coils being alternately arranged, the liquid being treated will be subjected to practically double the cooling effect over what could be accomplished by employing a single set of coils in each section.

While I have illustrated in Fig. 4 diagrammatically the arrangement of the coils and their supply and discharge pipes with particular reference to their use in connection with cooling media, it will be understood that this apparatus is adapted and intended for use in connection with heating media for pasteurization. Thus, instead of admitting cold water and brine to the different sections, the coils 28 and 29 will, when the device is used for heating, have admitted thereto a heating fluid through the pipes 24 and 32, and, as readily will be understood, the coils 28 and 29 may have admitted thereto the heating medium at a lower temperature than that admitted to the coils 20 and 21, whereby the heating of the material being treated will increase progressively. In case very high pasteurizing temperature, say 170° F. or over, are required, a reversal of the heating media travel is desirable. Where counter-current travel of milk being treated and the heating medium takes place, I have found that the milk solids, especially the albumen and casein, will tend to precipitate and leave an undesirable coating on the coil surfaces, thus interfering with efficient radiation. This objection can be eliminated almost entirely by reversing the flow of the heating media so that the same will enter through the pipes 27 and 35 and discharge through pipes 24 and 32. In other words, the travel of liquid being treated and the heating media will be in the same direction.

A valuable point in connection with this apparatus is the helical arrangement of the coils, which assists very greatly in spreading the treated liquid, for not only is the flow downward, but progressive as well. In fact I have found that the treated liquid will travel a third of the diameter around the pipes of the coil from the vertical in its descent. Another important point is that there are no sharp corners to obstruct the heating or cooling media, and the apparatus readily is cleaned, as it is easy of access.

The regulation of the temperatures of the heating or cooling media may be accomplished by manual control or thermostatically, as preferred.

Having thus described my invention, what I claim as new and desire to secure by Letters Patent, is:—

1. An apparatus of the character described, comprising a plurality of coils alternately disposed helically, means for supplying a heating or cooling fluid separately to said coils, and means for feeding the liquid to be treated upon the topmost coil.

2. An apparatus of the character described, comprising a plurality of coils alternately disposed helically, means for supplying a heating or cooling fluid separately to said coils from opposite sides of the apparatus and for similarly discharging the same, and means for feeding the liquid to be treated upon the topmost coil.

3. An apparatus of the character described, comprising helical coils divided horizontally into independent sections, each of said sections being subdivided into separate sets of coils alternately disposed, means for supplying heating or cooling fluids separately to said sections and sets, and means for feeding the liquid to be treated upon the topmost coil.

4. An apparatus of the character described, comprising helical coils divided horizontally into independent sections, each of said sections being subdivided into separate sets of coils alternately disposed, means for supplying heating or cooling fluids of different temperatures to said sections, and means for feeding the liquid to be treated upon the topmost coil.

5. An apparatus of the character described, comprising a helical coil, means for supplying heating or cooling fluid thereinto, an annular ring supported upon the topmost coil, and a supply pan supported above and from said ring and apertured over said ring whereby its contents would discharge upon said ring and flow thence downwardly over said helical coil.

In testimony whereof, I have hereunto set my hand this 17th day of January, 1920.

AAGE JENSEN.